United States Patent
Laurencelle et al.

(10) Patent No.: US 11,713,905 B2
(45) Date of Patent: Aug. 1, 2023

(54) SYSTEM FOR REDUCING RISK OF BACTERIAL CONTAMINATION OF A WATER HEATER

(71) Applicant: HYDRO-QUÉBEC, Montréal (CA)

(72) Inventors: Francois Laurencelle, Trois-Rivieres (CA); Jonathan Despres, St-Etienne-des-Gres (CA); Serge Gauthier, Notre-Dame-du-Mont-Carmel (CA)

(73) Assignee: HYDRO-QUÉBEC, Montreal (CA)

( * ) Notice: Subject to any disclaimer, the term of this patent is extended or adjusted under 35 U.S.C. 154(b) by 0 days.

(21) Appl. No.: 17/930,518

(22) Filed: Sep. 8, 2022

(65) Prior Publication Data

US 2023/0095475 A1    Mar. 30, 2023

(30) Foreign Application Priority Data

Sep. 27, 2021    (CA) ................................ CA 3132008

(51) Int. Cl.
*F24H 15/14*    (2022.01)
*G05D 23/13*    (2006.01)

(52) U.S. Cl.
CPC ........... *F24H 15/14* (2022.01); *G05D 23/134* (2013.01)

(58) Field of Classification Search
CPC ...................................................... F24H 15/14
See application file for complete search history.

(56) References Cited

U.S. PATENT DOCUMENTS

| | | | |
|---|---|---|---|
| 4,777,347 A | 10/1988 | Mottershead | |
| 6,370,328 B1 | 4/2002 | Mottershead | |
| 10,215,445 B1 | 2/2019 | Mottershead | |
| 11,421,896 B1* | 8/2022 | McCain | F24D 19/1066 |
| 2010/0123014 A1* | 5/2010 | Beagen | F16K 31/002 |
| | | | 236/12.2 |
| 2012/0037095 A1* | 2/2012 | DuPlessis | F24D 19/1015 |
| | | | 236/12.11 |
| 2018/0321697 A1* | 11/2018 | Forrestal | G05D 23/1346 |
| 2019/0218540 A1* | 7/2019 | Ding | C12N 15/90 |
| 2020/0124321 A1* | 4/2020 | Shaffer | H05B 1/0283 |
| 2021/0215353 A1* | 7/2021 | Yashar | F24H 1/10 |
| 2022/0042686 A1* | 2/2022 | Dettmering | B01D 35/147 |

* cited by examiner

*Primary Examiner* — Nathaniel Herzfeld
(74) *Attorney, Agent, or Firm* — Womble Bond Dickinson (US) LLP (57) ABSTRACT

A system and a method for reducing a risk of bacterial contamination in a water heater are disclosed. A bypass conduit is connected to cold water supply and hot water outlet conduits of the water heater with T-shaped fittings, the bypass conduit generally extending in a same horizontal plane as the fittings and running alongside a top surface of the water heater. A thermostatic mixing valve is integrated to the bypass conduit close to the fitting with the hot water outlet so that its mixed water outlet is connected to the fitting with the hot water and its cold water inlet is connected to the fitting with the cold water, its hot water inlet being blocked. The thermostatic mixing valve is adjusted to regulate the hot water temperature at the outlet of the system and to produce a thermosiphon loop in the system depending on whether there is extraction or no extraction of hot water from the water heater.

9 Claims, 4 Drawing Sheets

FIG. 4

SYSTEM FOR REDUCING RISK OF BACTERIAL CONTAMINATION OF A WATER HEATER

FIELD OF THE INVENTION

The invention generally relates to a water heater installation, and more particularly to a system and a method for reducing a risk of bacterial contamination of a water heater.

BACKGROUND

Interrupting the power supply of water heaters allows reducing the power demand of an electrical network supplying them during peak periods when the network is under heavy load. However, such load shedding must be carried out under certain conditions, in particular without increasing the risk of bacterial contamination of domestic or other water heaters.

Bacterial contamination is frequent in domestic water heaters. The most commonly observed bacterium is *Legionella*. This bacterium is endemic in the environment. It can infect humans when contaminated droplets are inhaled and it can cause Pontiac fever or Legionnaire's disease. It can be introduced into the water heater by cold water coming for example from an aqueduct system or a private well. It can proliferate in stagnant water having a temperature below 45° C. It can be eliminated by maintaining the water at a temperature above 50° C. for a variable time period, from a few minutes to a few hours, as a function of the temperature.

The temperature is not homogeneous in a domestic water heater tank. A thermal stratification develops when hot water is extracted. The thermal stratification is also maintained by the natural convection inside the tank because cold water, denser than hot water, tends to remain in the lower part of the tank.

A criterion that may be used for example by a public health organization is that the lower part of the water heater has maintained a minimum temperature of 55° C. for a cumulative period of at least four hours, over the last 24 hours, before a period of temporary load shedding of the power supply of the water heaters can be initiated. This condition is difficult to achieve with conventional electric water heaters. Furthermore, to avoid the risk of physical burns on contact with hot water, the temperature of the hot water at the outlet of the system should not exceed 60° C. Under these conditions, the thermal conduction and the convection currents caused by the heating of the water are insufficient to undo the thermal stratification in the lower part of the tank. A part of the water volume in the lower part of the tank thus does not reach a sufficient temperature to eliminate *Legionella*.

Many approaches have been proposed in the past to attempt solving the problem of bacterial contamination in water heaters. One approach is to manufacture the tank in stainless steel. This material has a good resistance to corrosion and its surface is not prone to the formation of a bacterial biofilm. However, water heaters with stainless steel tanks are expensive compared to conventional electric water heaters. Another approach is to increase the setpoint temperature of the thermostats controlling the heating elements of the water heater. A sufficiently high setpoint temperature, for example above 75° C., allows maintaining the whole volume of the tank at a temperature sufficient to eliminate *Legionella*. However, the temperature at the outlet of the system must be limited to 60° C. to avoid the risk of physical burns, which implies that a thermostatic mixing valve should be installed at the outlet of the water heater. Also, the setting range of the thermostats which are generally used does not necessarily allow reaching a sufficient temperature. Furthermore, a higher temperature weakens the vitrification layer applied inside the tank of the water heater, which causes accelerated corrosion of the inner wall of the tank. Another approach is to use an electrically powered pump to intermittently recirculate water from the hot water outlet to the water inlet of the water heater so that the temperature becomes homogeneous inside the tank. The installation cost, the control and the maintenance of a recirculation pump are drawbacks. Another approach is to recirculate the water from the hot water outlet to the cold water inlet of the water heater through a thermosiphon loop. U.S. Pat. No. 6,370,328 (Mottershead) shows an example of a thermosiphon loop system. The system has a conduit between the water outlet and the water inlet of the water heater. The conduit is equipped with a check valve intended to prevent cold water from flowing through the conduit, which would break the thermosiphon loop in addition to uncontrollably and possibly excessively cooling the hot water coming out of the water heater. Despite the low cost of such a system, it is difficult to achieve a good balance between the watertightness of the check valve mechanism and the low flow resistance in the direction of the thermosiphon. Furthermore, in such a system, the correct operation of the check valve is not guaranteed and, moreover, the temperature of the hot water coming out of the water heater and supplying the hot water network is not controlled. Another approach is to use a water heater which is oversized with respect to the need in domestic hot water in order to reduce the probability that lukewarm water coming from the lower part of the tank be used due to an extraction of a large amount of hot water. The bacteria would not be eliminated but the risk of migration of the bacteria towards the domestic hot water network would be reduced. The higher cost, the required space and the weight increase of the water heater are drawbacks of this approach. Another approach is to put two water heaters in series. The water inlet coming for example from an aqueduct network or a well is then connected to the cold water inlet of a first water heater, the hot water outlet of which is connected to the cold water inlet of a second water heater, the hot water outlet of the second water heater supplying the hot water network. The advantages of this configuration are a doubling of the volume of hot water with respect to the tank of a single water heater and the fact that the tank of the second water heater is sterile since it is supplied with hot water preheated by the first water heater. However, the higher cost, the required space and the weight increase of the system represent drawbacks. Another approach consists, by using a device such as a valve actuated by a controller, in cutting off the circulation of water in the hot water network when there is not a minimum volume of hot water in the tank of the water heater at a sufficient temperature to guarantee its salubrity, in particular when an accumulation of water extractions has replaced a large proportion of the volume of hot water contained in the water heater with cold water and that this water did not have time to be heated up to the temperature necessary for its sterilization. The bacteria would not be eliminated but they would not have the possibility of migrating to the hot water network due to the cutoff. A major drawback is that no hot water would be available if there is a cutoff.

SUMMARY

An object of the present invention is to provide a system and a method for reducing a risk of bacterial contamination of a water heater, which is simple and economical while being reliable, and which may also regulate a temperature of water in an hot water outlet conduit of the water heater.

According to an embodiment of the invention, there is provided a system for reducing a risk of bacterial contamination in a water heater, the system comprising:

a first T-shaped fitting coupled to a cold water supply conduit of the water heater, the first T-shaped fitting being positioned close to a top surface of the water heater;

a second T-shaped fitting coupled to a hot water outlet conduit of the water heater, the second T-shaped fitting being positioned close to the top surface of the water heater, substantially in a same horizontal plane as the first T-shaped fitting;

a bypass conduit having ends respectively connected to the first and second T-shaped fittings, the bypass conduit substantially extending in the same horizontal plane as the first and second T-shaped fittings and running alongside the top surface of the water heater; and a thermostatic mixing valve integrated to the bypass conduit close to the second T-shaped fitting, the thermostatic mixing valve having a mixing chamber, hot and cold water inlets in communication with the mixing chamber, a mixed water outlet in communication with the mixing chamber, a thermal response element controlling water flows at the inlets according to a setpoint temperature at the mixed water outlet of the thermostatic mixing valve, and an adjustment arrangement of the thermal response element as a function of a temperature value defining the setpoint temperature, the hot water inlet of the thermostatic mixing valve being blocked, the cold water inlet of the thermostatic mixing valve being connected to the first T-shaped fitting by a first section of the bypass conduit, the mixed water outlet being connected to the second T-shaped fitting by a second section of the bypass conduit, the adjustment arrangement having an adjusted position in order to produce a thermosiphon loop where a natural circulation of water occurs from a hot water outlet of the water heater towards a cold water inlet of the water heater via the bypass conduit and through the water heater in absence of hot water extraction from the water heater, and to regulate a temperature of water flowing in the hot water outlet conduit of the water heater by circulation of water coming from the cold water supply conduit through the bypass conduit when extracting hot water from the water heater, the risk of bacterial contamination in the water heater being reduced by the thermosiphon loop.

The setpoint temperature defined by the temperature value may be comprised between 49° C. and 60° C. The thermal response element may comprise a plunger projecting between the inlets of the thermostatic mixing valve, closing elements respectively mounted on the plunger in facing positions with the inlets, and a mechanical thermostat coupled to the plunger in order to move the closing elements and cause an opening of one of the inlets and a proportional closing of the other inlet as a function of a water temperature measured near the water outlet of the thermostatic mixing valve, the adjustment arrangement being operatively coupled to the mechanical thermostat in order to adjust an axial position of the plunger and initial positions of the closing elements according to the setpoint temperature. The adjustment arrangement may comprise a handle operating a gear arrangement axially moving the mechanical thermostat and the plunger. The first and second sections of the bypass conduit connecting the thermostatic mixing valve to the first and second T-shaped fittings may define an L-shape. The cold water supply conduit of the water heater, the hot water outlet conduit of the water heater, the first and second T-shaped fittings, the cold water inlet of the thermostatic mixing valve, the mixed water outlet of the thermostatic mixing valve, and the bypass conduit preferably have nominal diameters of ¾ inch.

According to another embodiment of the invention, there is provided a method for reducing a risk of bacterial contamination in a water heater, the method comprising the steps of:

coupling a first T-shaped fitting to a cold water supply conduit of the water heater, the first T-shaped fitting being positioned close to a top surface of the water heater;

coupling a second T-shaped fitting to a hot water outlet conduit of the water heater, the second T-shaped fitting being positioned close to the top surface of the water heater, substantially in a same horizontal plane as the first T-shaped fitting;

respectively connecting ends of a bypass conduit to the first and second T-shaped fittings, the bypass conduit substantially extending in the same horizontal plane as the first and second T-shaped fittings and running alongside the top surface of the water heater; and integrating a thermostatic mixing valve to the bypass conduit close to the second T-shaped fitting, the thermostatic mixing valve having a mixing chamber, hot and cold water inlets in communication with the mixing chamber, a mixed water outlet in communication with the mixing chamber, a thermal response element controlling water flows at the inlets according to a setpoint temperature at the mixed water outlet of the thermostatic mixing valve, and an adjustment arrangement of the thermal response element as a function of a temperature value defining the setpoint temperature, the hot water inlet of the thermostatic mixing valve being blocked, the cold water inlet of the thermostatic mixing valve being connected to the first T-shaped fitting by a first section of the bypass conduit, the mixed water outlet being connected to the second T-shaped fitting by a second section of the bypass conduit, the adjustment arrangement being adjusted in order to produce a thermosiphon loop where a natural circulation of water occurs from a hot water outlet of the water heater towards a cold water inlet of the water heater via the bypass conduit and through the water heater in absence of hot water extraction from the water heater, and to regulate a temperature of water flowing in the hot water outlet conduit of the water heater by circulation of water coming from the cold water supply conduit through the bypass conduit when extracting hot water from the water heater, the risk of bacterial contamination in the water heater being reduced by the thermosiphon loop.

The setpoint temperature of the thermostatic mixing valve may be initially set by a pre-adjustment of the adjustment arrangement prior to installation of the thermostatic mixing valve in the system, for example at factory, and then by an adjustment of the adjustment arrangement after installation of the thermostatic mixing valve in the system.

BRIEF DESCRIPTION OF THE DRAWINGS

A detailed description of preferred embodiments of the invention will be given herein below with reference to the following drawings.

DETAILED DESCRIPTION OF THE
PREFERRED EMBODIMENTS

Figure 1:
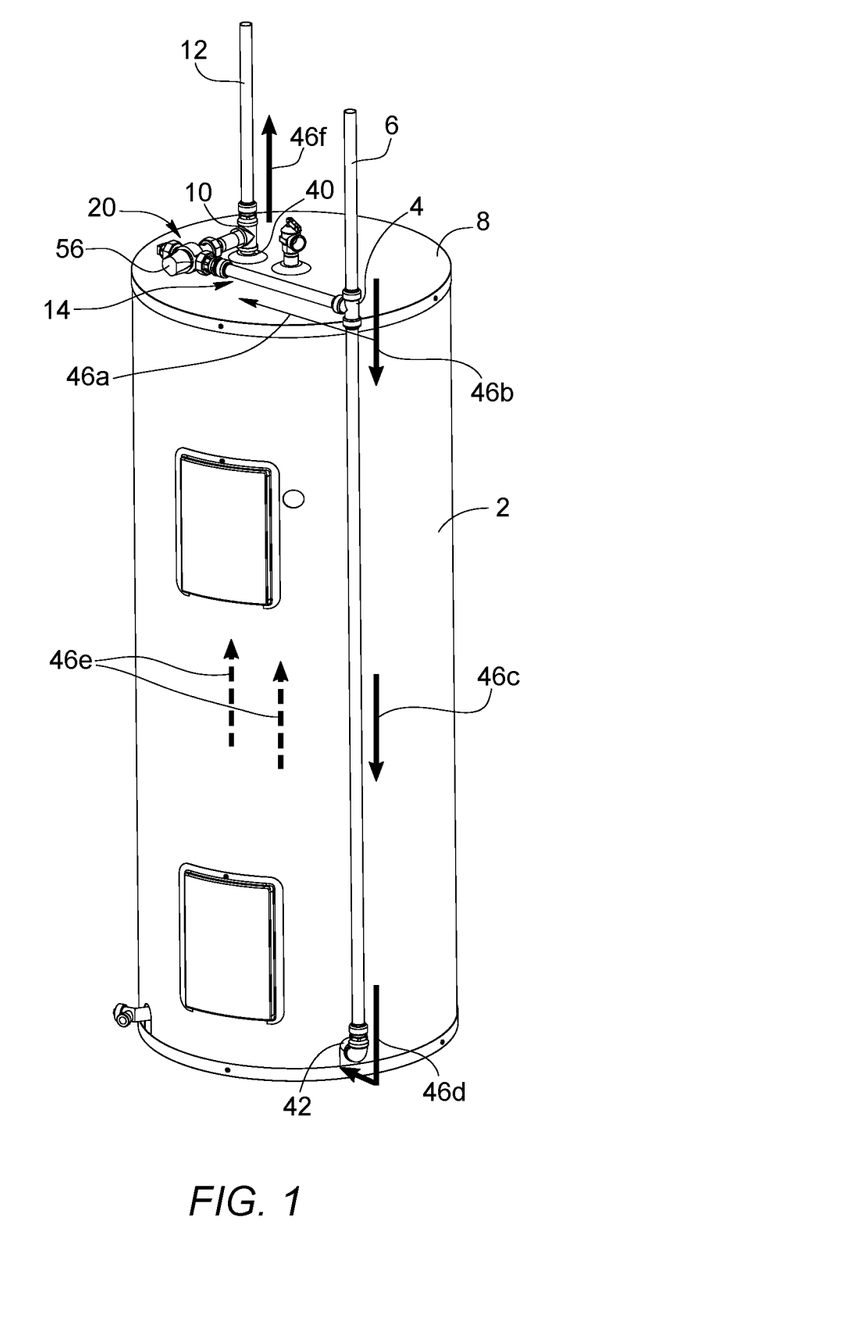
FIG. 1 is a schematic diagram illustrating a system for reducing a risk of bacterial contamination of a water heater according to the invention, during extraction of hot water from the water heater.

Referring to FIG. 1, a system for reducing a risk of bacterial contamination of a water heater 2 according to the invention is shown. The system comprises a first T-shaped fitting 4 coupled to a cold water supply conduit 6 of the water heater 2. The first fitting 4 is positioned close to a top surface 8 of the water heater 2. A second T-shaped fitting 10 is coupled to a hot water outlet conduit 12 of the water heater 2. The second fitting 10 is positioned close to the top surface 8 of the water heater 2, substantially in a same horizontal plane as the first fitting 4. The horizontal plane may also be herein assimilated as being a plane parallel or almost parallel to the top surface 8 of the water heater 2.

Figure 3:
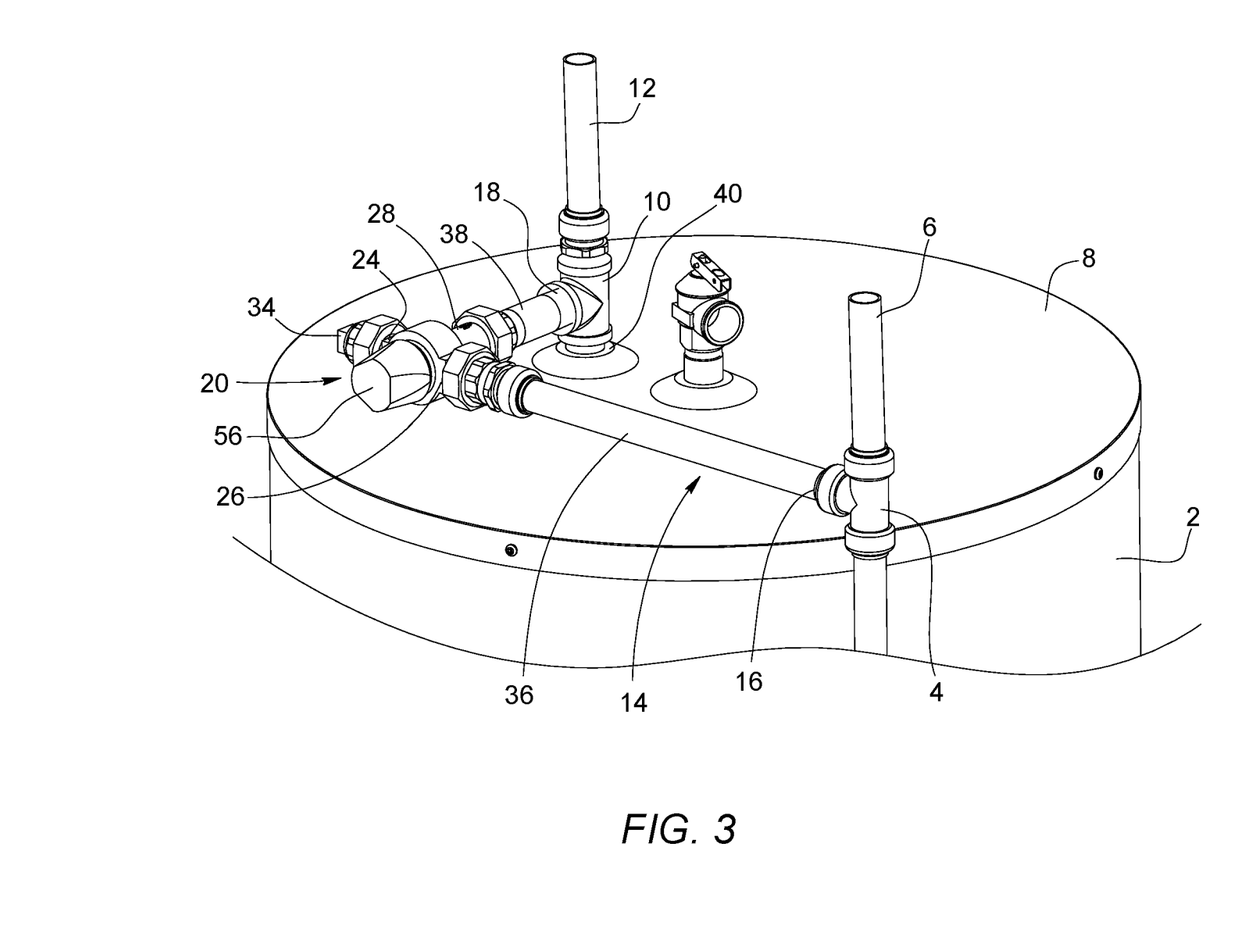
FIG. 3 is an enlarged view of an upper part of a system according to the invention as that of FIGS. 1 and 2.

Referring to FIG. 3, the system also comprises a bypass conduit 14 having ends 16, 18 respectively connected to the first and second fittings 4, 10. The bypass conduit 14 substantially extends in the same horizontal plane as the first and second fittings 4, 10 and runs alongside the top surface 8 of the water heater 2. A thermostatic mixing valve 20 is integrated to the bypass conduit 14 close to the second fitting 10.

Figure 4:
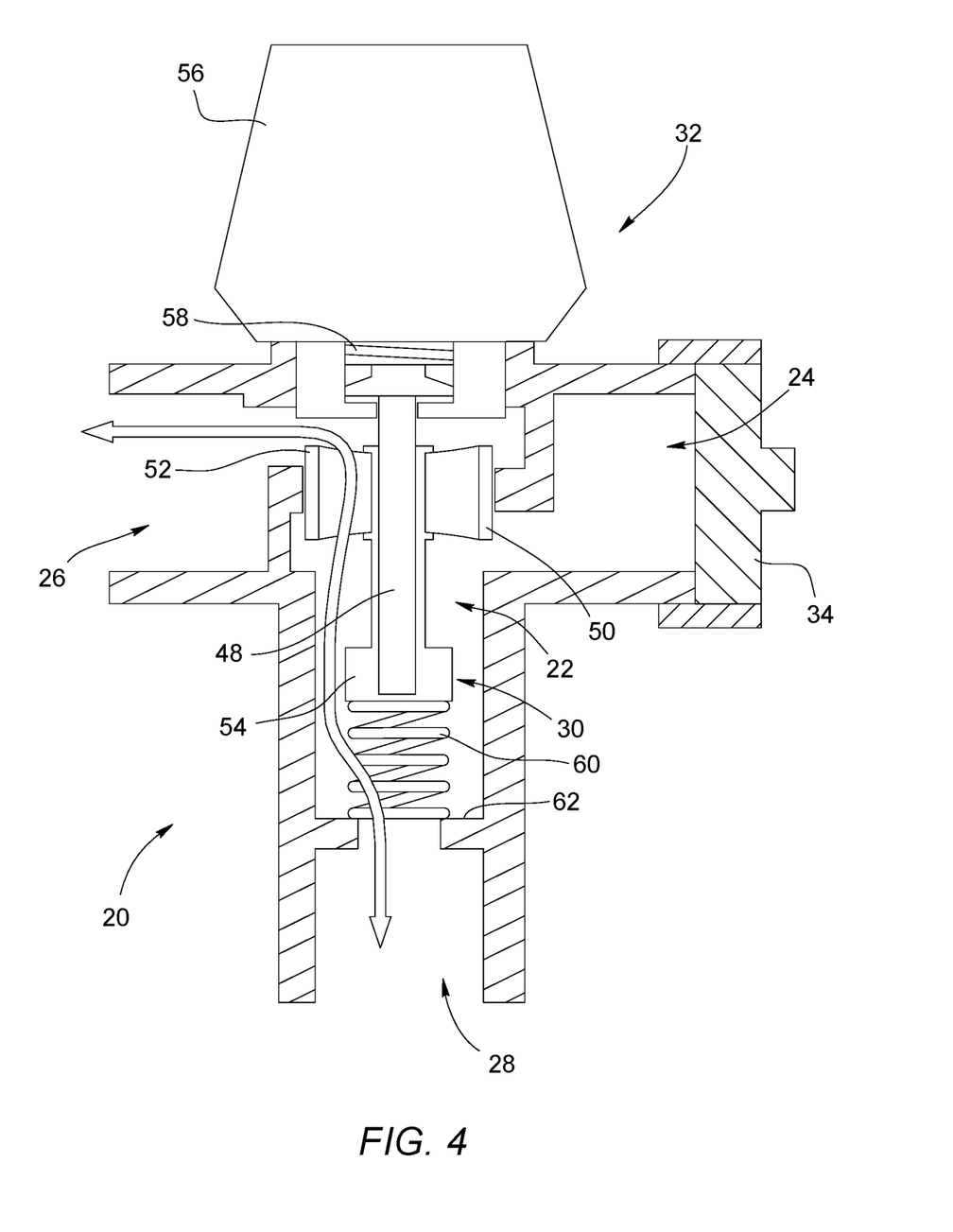
FIG. 4 is a cross-sectional view of a thermostatic mixing valve that may be used in a system according to the invention as that of FIGS. 1, 2 and 3.

Referring to FIG. 4, the thermostatic mixing valve 20 has a mixing chamber 22, hot and cold water inlets 24, 26 in communication with the mixing chamber 22, a mixed water outlet 28 in communication with the mixing chamber 22, a thermal response element 30 controlling water flows at the inlets 24, 26 according to a setpoint temperature at the mixed water outlet 28 of the thermostatic mixing valve 20, and an adjustment arrangement 32 for adjustment of the thermal response element 30 as a function of a temperature value defining the setpoint temperature.

Referring back to FIG. 3, the hot water inlet 24 of the thermostatic mixing valve 20 is blocked, for example with a cap 34 which screws onto the hot water inlet 24. The cold water inlet 26 of the thermostatic mixing valve 20 is connected to the first fitting 4 by a first section 36 of the bypass conduit 14. The mixed water outlet 28 of the thermostatic mixing valve 20 is connected to the second fitting 10 by a second section 38 of the bypass conduit 14.

Figure 2:
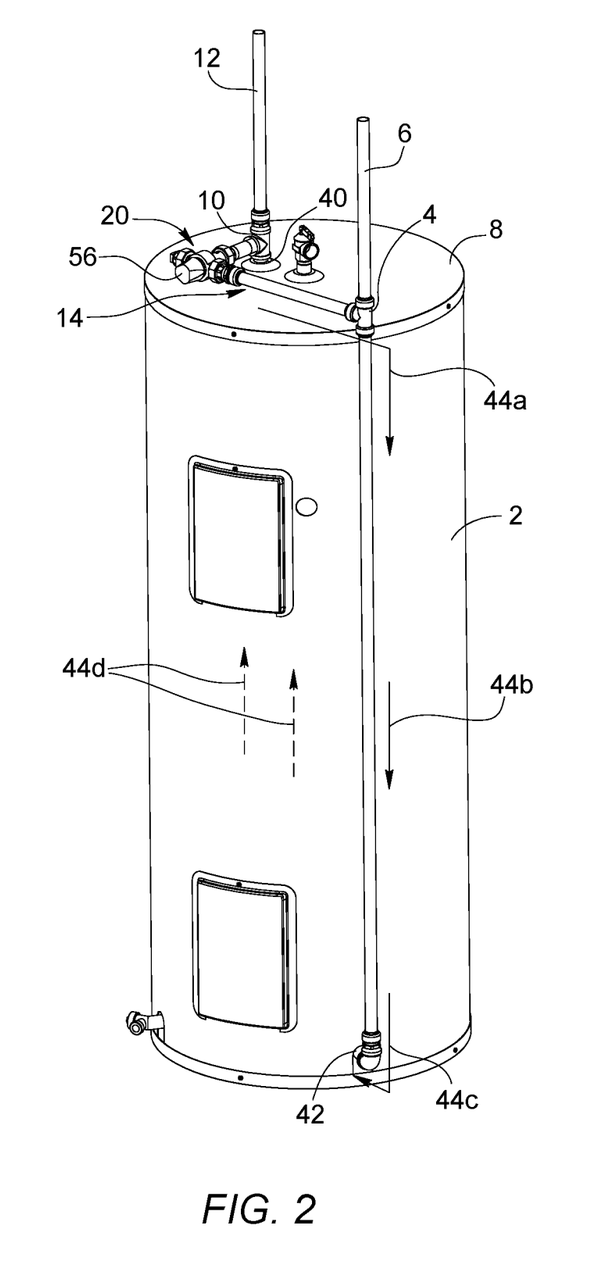
FIG. 2 is a schematic diagram illustrating a system according to the invention as that of FIG. 1, in absence of hot water extraction from the water heater.

As shown in FIG. 2, the adjustment arrangement 32 (shown in FIG. 4) has an adjusted position (is adjusted) in order to produce a thermosiphon loop where a natural circulation of water occurs from a hot water outlet 40 of the water heater 2 towards a cold water inlet 42 of the water heater 2 via the bypass conduit 14 and through the water heater 2 by following the direction of arrows 44a, 44b, 44c and 44d in absence of hot water extraction from the water heater 2.

As shown in FIG. 1, the adjustment of the adjustment arrangement 32 (shown in FIG. 4) also has the effect of regulating a temperature of water flowing in the hot water outlet conduit 12 of the water heater 2 by circulation of water coming from the cold water supply conduit 6 through the bypass conduit 14 during extraction of hot water from the water heater 2 by following the direction of arrow 46a, the usual circulation of water during extraction following the direction of arrows 46b, 46c, 46d, 46e and 46f. In addition, the thermostatic mixing valve 20 adjusts its opening, thus the flow rate, as a function of the temperature sought in its mixing chamber 22 and its outlet 28. The risk of bacterial contamination in the water heater 2 is reduced by the thermosiphon loop which allows a circulation of water from the top towards the bottom of the water heater 2. The thermosiphon loop allows in particular both breaking a possible thermal stratification resulting from hot water extraction from the water heater 2 and eliminating a bacterial contamination in the water heater 2. Furthermore, *Legionella* is destroyed by the thermosiphon loop which brings hot water to the lower part of the tank of the water heater 2 in absence of extraction.

Referring again to FIG. 3, in the context of the invention, the inlet 26 of the thermostatic mixing valve 20 will act as outlet and the outlet 28 of the thermostatic mixing valve 20 will act as inlet when there is no extraction. When there is extraction, the inlet 26 behaves as inlet and the outlet 28 behaves as outlet.

The mixed water outlet 28 of the thermostatic mixing valve 20 is preferably connected to the fitting 10 located at the outlet 40 of the water heater 2 as close as possible, for example at a few centimeters from the fitting 10, to promote an important heat exchange between the hot water outlet 40 of the water heater 2 and the mixed water outlet 28 of the thermostatic mixing valve 20. Consequently, the section 38 of the bypass conduit 14 may be much shorter than the section 36 and have a length just enough to connect the thermostatic mixing valve 20 to the fitting 10. The first and second sections 36, 38 of the bypass conduit 14 connecting the thermostatic mixing valve 20 to the first and second fittings 4, 10 may define an "L" shape as shown.

The cold water supply conduit 6 of the water heater 2, the hot water outlet conduit 12 of the water heater 2, the first and second fittings 4, 10, the cold water inlet 26 of the thermostatic mixing valve 20, the mixed water outlet 28 of the thermostatic mixing valve 20, and the bypass conduit 14 may advantageously have nominal diameters of ¾ inch to avoid creating a resistance to the flow in the thermosiphon loop. The course of the thermosiphon loop is preferably as short as possible. The segment of the cold water supply conduit 6 forming part of the thermosiphon loop, e.g. under the first fitting 4, is preferably continuous and straight, and runs alongside or passes vertically through the water heater 2 depending on whether the water heater 2 is a model with a cold water supply conduit 6 outside or inside the water heater 2. The components of the piping used in the system according to the invention may be for example made of copper, brass or plastic in compliance to the construction standards of a hot water network for domestic or other purposes.

The setpoint temperature of the thermostatic mixing valve 20 is preferably comprised between 49° C. and 60° C. in order to reduce the risks of physical burns. The setpoint temperature of the thermostatic mixing valve 20 may be initially set by a pre-adjustment of the adjustment arrangement 32 prior to installation of the thermostatic mixing valve 20 in the system, for example at factory, then by an adjustment of the adjustment arrangement 32 after installation of the thermostatic mixing valve 20 in the system, for example to take into account the temperatures of the cold water supplying the water heater 2, which may vary for one installation to another. The setpoint temperature of the thermostatic mixing valve 20 may however be set only at factory or after installation if desired.

Referring again to FIG. 4, according to a possible embodiment, the thermal response element 30 comprises a plunger 54 projecting between the inlets 24, 26 of the thermostatic mixing valve 20, closing elements 50, 52 respectively mounted on the plunger 54 in facing positions with the inlets 24, 26, and a mechanical thermostat 48 coupled to the plunger 54 in order to move the closing elements 50, 52 and cause an opening of one of the inlets 24, 26 and a proportional closing of the other inlet 26 or 24 as a function of a water temperature measured near the water outlet 28 of the thermostatic mixing valve 20. The adjustment arrangement 32 is operatively coupled to the mechanical thermostat 48 in order to adjust an axial position of the plunger 54 and initial positions of the closing elements 50, 52 according to the setpoint temperature. According to an embodiment, the adjustment arrangement 32 comprises a handle 56 operating a gear arrangement 58 axially moving the mechanical thermostat 48 and the plunger 54. A spring 60 between the plunger 54 and an internal shoulder 62 in the mixed water outlet 28 allows an axial play of the plunger 54 to move the closing elements 50, 52 according to the temperature measured near the mixed water outlet 28. The mechanical thermostat 48 may be formed, for example, by a thermostatic cartridge containing a wax expanding or contracting depending on the water temperature. Other models of thermostatic mixing valves may be used in the system according to the invention, provided that the chosen model causes little resistance to the flow of water and can be operated in order to provide the check and temperature regulation functions as described hereinabove. If the thermostatic mixing valve 20 is provided with check valves at the inlets 24, 26 or at the water outlet 28 of the thermostatic mixing valve 20, these check valves must be removed before its installation in the system according to the invention.

Referring to FIG. 1, in short, cold water always enters in the lower part of the tank of a water heater, whether it is configured with an inlet 42 (with associated fitting) at the bottom as shown, or an inlet at the top (not shown). When there is an extraction of hot water as shown by the arrow 46*f*, a pressure differential between the inlet 42 of water (coming for example from an aqueduct system or a private well) and the domestic (or other) hot water network causes the cold water to flow through the water heater 2, which is the preferred path. However, the pressure differential also causes the cold water to flow through the bypass conduit 14 against the thermosiphon phenomenon. This back flow is blocked or controlled by the thermostatic mixing valve 20 to prevent an excessive amount of cold water from bypassing the water heater 2 and, by mixing with the hot water coming out from the water heater 2, to cool the flow of hot water in the conduit 12. In absence of hot water extraction as shown in FIG. 2, the thermostatic mixing valve 20 opens the passage allowing the hot water to circulate through the bypass conduit 14 and to flow in the lower part of the water heater 2, caused by the natural thermosiphon phenomenon. During a hot water extraction as shown in FIG. 1, the thermostatic mixing valve 20 either completely or partially closes the passage, according to its setting. If the bypass conduit 14 remains partially open during an extraction, a low back flow of cold water runs through it. This cold water then mixes with the hot water getting out of the water heater 2, to supply the hot water network at a controlled temperature not likely to cause physical burns even if a setpoint temperature of the heating elements (not shown) of the water heater 2 is high, for example higher than 60° C. For a conventional water heater, the setpoint temperatures of the heating elements are generally adjustable via control thermostats (not shown) within a range covering from 60° C. to 66° C. The system according to the invention will be the more efficient as the heating element located the lowest in the water heater 2 is near the bottom of the tank, and as the entry or mixing point of the cold water in the tank of the water heater 2 is located as low as possible. The system according to the invention may also be implemented using a water heater 2 having a hot water outlet 40 (with associated fitting) located at the top of the tank.

The gear arrangement 58 of the thermostatic mixing valve 20 is preferably pre-adjusted at a temperature lower by a few Celsius degrees than the setpoint temperature of the heating elements of the water heater 2, for example between 49° C. and 60° C. During a hot water extraction, the water pressure in the supply conduit 6 pushes cold water towards the cold water inlet 42 of the water heater 2. At the same time, the water pressure in the supply conduit 6 also pushes cold water through the thermostatic mixing valve 20 via the bypass conduit 14. A decrease of the water temperature at the outlet 28 (shown in FIG. 4) of the thermostatic mixing valve 20, detected by the mechanical thermostat 48 (shown in FIG. 4) of the thermostatic mixing valve 20, causes a reduction of the opening of its cold water inlet 16 (shown in FIG. 4) which partially or completely closes. The result is a partial or complete interruption of the direct flow of cold water towards the conduit 12 through the thermostatic mixing valve 20 and the bypass conduit 14. Cold water then primarily takes the other way consisting in running through the tank of the water heater 2. As the cold water inlet 26 of the thermostatic mixing valve 20 closes, the hot water inlet 24 of the thermostatic mixing valve 20 opens. However, the opening of the hot water inlet 24 has no effect since it is blocked.

The gear arrangement 58 of the thermostatic mixing valve 20 may be adjusted so that the temperature of water in the conduit 12 supplying the hot water network is slightly lower than the temperature of water at the hot water outlet 40 of the water heater 2 due to the mixing of the hot water coming from the water heater 2 and the cold water that ran through the bypass conduit 14. In such a case, as during an extraction, the flow of water through the thermostatic mixing valve 20 is either zero or small. The high thermal conduction between the fitting 10 and the mixed water outlet 28 (shown e.g. in FIG. 4) of the thermostatic mixing valve 20 allows reaching a temperature at the mixed water outlet 28 higher than the setpoint temperature of the thermostatic mixing valve 20, causing a partial opening of the cold water inlet 26 of the thermostatic mixing valve 20. The thermostatic mixing valve 20 then lets a trickle of cold water 46*a* pass which mixes with the hot water coming out of the water heater 2, having the effect of lowering the temperature of water in the conduit 12. This partial opening persists throughout an extraction because the mechanical thermostat 48 of the thermostatic mixing valve 20 is influenced both by the temperature of cold water running through the bypass conduit 14 and the heat carried by thermal conduction from the hot water outlet 40 of the water heater 2. This is to promote an efficient heat exchange by thermal conduction that the thermostatic mixing valve 20 may be advantageously positioned near the fitting 10 connected to the hot water outlet 40 of the water heater 2.

In absence of an extraction, the pressure becomes almost equal between the portions of the conduits 6, 12 above the fittings 4, 10. However, water contained in the water column of the thermosiphon loop being colder and thus denser and heavier than that contained in the tank of the water heater 2, the water column of the thermosiphon loop tends, due to earth's gravity, to flow out into the lower part of the tank of the water heater 2. This tendency will have an impact at the outlet 40 of the water heater 2 in the form of a pressure imbalance likely to create a moderate and continuous flow rate of closed circuit water circulation though the water heater 2 and the thermosiphon loop. In this situation, hot water runs through the thermostatic mixing valve 20 from the mixed water outlet 28 towards the cold water inlet 42, thus in a direction opposite to a regular use of the thermostatic mixing valve 20, hence the need to remove any check valve of the thermostatic mixing valve 20 if necessary. The thermostatic mixing valve 20 is in a way installed in reverse in the system according to the invention with respect to a conventional installation of a thermostatic mixing valve. Following an extraction of hot water, there may be a latency period before water circulation in the thermosiphon loop is restored. This period may vary, for example, depending on the duration of the last extraction of hot water or depending on a distance between the hot water outlet 40 of the water heater 2 and the mixed water outlet 28 of the thermostatic mixing valve 20 or depending on the adjustment of the setpoint temperature of the thermostatic mixing valve 20. This circulation of hot water across the thermostatic mixing valve 20 causes or maintains, through the mechanical thermostat 48, the opening of the cold water inlet 26 of the thermostatic mixing valve 20. The thermal losses of the thermosiphon loop allows maintaining the temperature differential between the two water columns of the thermosiphon loop and of the water heater 2, even after cold water in the portion of the conduit 6 between the fitting 4 and the inlet 42 of the water heater 2 has been completely replaced by hot water having been in the tank of the water heater 2 for a while, which maintains a residual flow for example in the order of 500 millilitres per minute in the thermosiphon loop. The continuous supply of hot water, slightly cooled down by the thermal losses of the thermosiphon loop, raises the temperature in the lower part of the water heater 2, which allows increasing the length of the periods where the whole volume of water contained in the tank of the water heater, including the lower part, meets a prescribed salubrity condition. Likewise, during an extraction of hot water, there may be a small latency period before the thermosiphon loop breaks in favor of a cold water trickle towards the conduit 12, for example depending on a flow rate of the hot water extraction.

The system according to the invention may be carried out at low cost with respect to many other solutions proposed in the field. The system according to the invention requires no or little maintenance after its installation. It takes up little extra space with respect to a conventional installation of a water heater. The system according to the invention and the related method can be carried out using an existing water heater or a new water heater to which a bypass conduit 14 equipped with the thermostatic mixing valve 20 is added. The system according to the invention has no equipment, apart from the water heater 2, requiring an electrical connection, and no controller and no electronic communication system. The system according to the invention allows, in absence of hot water extraction, considering an appropriate adjustment of the thermostats of the water heater 2 and an appropriate adjustment of the handle 56 of the thermostatic mixing valve 20 ensuring a sufficient flow rate in the thermosiphon loop, to eliminate or prevent a bacterial contamination in the lower part of the water heater 2. Not only the bacteria can be eliminated as a result of the supply of water at a higher temperature in the lower part of the tank of the water heater 2, but also by the continuous circulation of water in its tank, given that a bacterial contamination preferably develops in stagnant water. The system according to the invention allows, during hot water extraction, considering an appropriate adjustment of the thermostats of the water heater 2 and an appropriate adjustment of the handle 56 of the thermostatic mixing valve 20 allowing a mix of cold water and hot water at a controlled temperature at the outlet of the system formed by the part of the conduit 12 above the fitting 10, to eliminate the risk of physical burns by contact with hot water. It thus becomes possible to increase the setpoint temperature of the heating elements of a water heater over 60° C. to promote elimination of bacterial contamination made possible by the thermosiphon loop without simultaneously increase the temperature at the outlet of the system, due to the control of temperature performed by the thermostatic mixing valve 20. The system according to the invention is robust to an obstruction of the bypass conduit 14 given that the thermostatic mixing valve 20 is traversed by water in opposite directions during extractions versus absence of extraction, which may allow unblocking it when needed. The system according to the invention is likely to satisfy the sanitary criteria of a public health organization since in general, during night, a long enough time period without extraction of hot water allows the water in the lower part of the tank of a water heater to reach and maintain a temperature over 55° C. during more than four hours, as a result of the circulation of water through the thermosiphon loop. A water heater equipped with a system according to the invention could then participate to a program for controlling its electrical power supply for management needs of power demand of an electrical network during a peak period.

While embodiments of the invention have been illustrated in the accompanying drawings and described above, it will be evident to those skilled in the art that modifications may be made therein without departing from the invention.

The invention claimed is:

1. A system for reducing a risk of bacterial contamination in a water heater, the system comprising:
   a first T-shaped fitting coupled to a cold water supply conduit of the water heater, the first T-shaped fitting being positioned close to a top surface of the water heater;
   a second T-shaped fitting coupled to a hot water outlet conduit of the water heater, the second T-shaped fitting being positioned close to the top surface of the water heater, substantially in a same horizontal plane as the first T-shaped fitting;
   a bypass conduit having ends respectively connected to the first and second T-shaped fittings, the bypass conduit substantially extending in the same horizontal plane as the first and second T-shaped fittings and running alongside the top surface of the water heater; and
   a thermostatic mixing valve integrated to the bypass conduit close to the second T-shaped fitting, the thermostatic mixing valve having a mixing chamber, hot and cold water inlets in communication with the mixing chamber, a mixed water outlet in communication with the mixing chamber, a thermal response element controlling water flows at the inlets according to a setpoint temperature at the mixed water outlet of the thermostatic mixing valve, and an adjustment arrangement of the thermal response element as a function of a temperature value defining the setpoint temperature, the hot water inlet of the thermostatic mixing valve being blocked, the cold water inlet of the thermostatic mixing valve being connected to the first T-shaped fitting by a first section of the bypass conduit, the mixed water outlet being connected to the second T-shaped fitting by a second section of the bypass conduit, the adjustment arrangement having an adjusted position in order to produce a thermosiphon loop where a natural circulation of water occurs from a hot water outlet of the water heater towards a cold water inlet of the water heater via the bypass conduit and through the water heater in absence of hot water extraction from the water heater, and to regulate a temperature of water flowing in the hot water outlet conduit of the water heater by circulation of water coming from the cold water supply conduit through the bypass conduit when extracting hot water from the water heater, the risk of bacterial contamination in the water heater being reduced by the thermosiphon loop.

2. The system according to claim 1, wherein the setpoint temperature of the thermostatic mixing valve defined by the temperature value is comprised between 49° C. and 60° C.

3. The system according to claim 1, wherein the thermal response element comprises a plunger projecting between the inlets of the thermostatic mixing valve, closing elements respectively mounted on the plunger in facing positions with the inlets, and a mechanical thermostat coupled to the plunger in order to move the closing elements and cause an opening of one of the inlets and a proportional closing of the other inlet as a function of a water temperature measured near the water outlet of the thermostatic mixing valve, the adjustment arrangement being operatively coupled to the mechanical thermostat in order to adjust an axial position of the plunger and initial positions of the closing elements according to the setpoint temperature.

4. The system according to claim 3, wherein the adjustment arrangement comprises a knob operating a gear arrangement axially moving the plunger.

5. The system according to claim 1, wherein the first and second sections of the bypass conduit connecting the thermostatic mixing valve to the first and second T-shaped fittings define an L-shape.

6. The system according to claim 1, wherein the cold water supply conduit of the water heater, the hot water outlet conduit of the water heater, the first and second T-shaped fittings, the cold water inlet of the thermostatic mixing valve, the mixed water outlet of the thermostatic mixing valve, and the bypass conduit have nominal diameters of ¾ inch.

7. A method for reducing a risk of bacterial contamination in a water heater, the method comprising the steps of:
coupling a first T-shaped fitting to a cold water supply conduit of the water heater, the first T-shaped fitting being positioned close to a top surface of the water heater;
coupling a second T-shaped fitting to a hot water outlet conduit of the water heater, the second T-shaped fitting being positioned close to the top surface of the water heater, substantially in a same horizontal plane as the first T-shaped fitting;
respectively connecting ends of a bypass conduit to the first and second T-shaped fittings, the bypass conduit substantially extending in the same horizontal plane as the first and second T-shaped fittings and running alongside the top surface of the water heater; and
integrating a thermostatic mixing valve to the bypass conduit close to the second T-shaped fitting, the thermostatic mixing valve having a mixing chamber, hot and cold water inlets in communication with the mixing chamber, a mixed water outlet in communication with the mixing chamber, a thermal response element controlling water flows at the inlets according to a setpoint temperature at the mixed water outlet of the thermostatic mixing valve, and an adjustment arrangement of the thermal response element as a function of a temperature value defining the setpoint temperature, the hot water inlet of the thermostatic mixing valve being blocked, the cold water inlet of the thermostatic mixing valve being connected to the first T-shaped fitting by a first section of the bypass conduit, the mixed water outlet being connected to the second T-shaped fitting by a second section of the bypass conduit, the adjustment arrangement being adjusted in order to produce a thermosiphon loop where a natural circulation of water occurs from a hot water outlet of the water heater towards a cold water inlet of the water heater via the bypass conduit and through the water heater in absence of hot water extraction from the water heater, and to regulate a temperature of water flowing in the hot water outlet conduit of the water heater by circulation of water coming from the cold water supply conduit through the bypass conduit when extracting hot water from the water heater, the risk of bacterial contamination in the water heater being reduced by the thermosiphon loop.

8. The method according to claim 7, wherein the setpoint temperature of the thermostatic mixing valve defined by the temperature value adjusted by the adjustment arrangement is comprised between 49° C. and 60° C.

9. The method according to claim 7, wherein the setpoint temperature of the thermostatic mixing valve is initially set by a pre-adjustment of the adjustment arrangement prior to installation of the thermostatic mixing valve on the water heater, and then by an adjustment of the adjustment arrangement after installation of the thermostatic mixing valve on the water heater.

* * * * *